Jan. 14, 1969 A. V. HAAG ETAL 3,422,399
SELECTION CIRCUIT FOR SIMULTANEOUSLY ENABLED
NEGATIVE RESISTANCE DEVICES
Filed Aug. 23, 1965 Sheet 1 of 3

INVENTORS A. V. HAAG
D. VEDDER
BY
Charles Scott Phelan
ATTORNEY

United States Patent Office 3,422,399

Patented Jan. 14, 1969

3,422,399

SELECTION CIRCUIT FOR SIMULTANEOUSLY ENABLED NEGATIVE RESISTANCE DEVICES

Arthur V. Haag and Dietrich Vedder, Columbus, Ohio, assignors to Bell Telephone Laboratories, Incorporated, New York, N.Y., a corporation of New York Filed Aug. 23, 1965, Ser. No. 481,832

U.S. Cl. 340—147 16 Claims

Int. Cl. H04q *1/00; 3/00*

This invention relates to a selecting circuit and more particularly it relates to such a circuit which is adapted to select for operation a single one of a plurality of simultaneously enabled negative resistance devices.

One example of a negative resistance device to which the present invention can be applied is a PNPN semiconductor device, and the invention is herein described in connection with such devices having two electrodes. PNPN devices have voltage-current characteristics such that the diode members of the device family must have applied thereto a predetermined minimum potential difference in order to cause the device to break down for forward conduction at a substantial current level. After forward breakdown the device continues to conduct at substantial current level, but at much lower potential difference levels, as long as a predetermined minimum sustaining current is maintained.

Negative resistance devices of different types have heretofore been employed in lockout circuits. In such circuits plural branch circuit paths are provided and each includes a different negative resistance device. The activation of one of the plural devices places such a small potential difference across all of the plural branch circuits that the negative resistance devices in the other branch circuit paths are locked out of their respective conducting conditions because it is not possible to produce across any of them a potential difference which is at least equal to their forward breakdown voltage. However, the lockout circuits heretofore used in the art generally depend upon use in a system wherein it is unlikely that more than one of the devices will be enabled for conduction at the same time.

It is possible in such prior art systems for more than one of the devices to be simultaneously enabled. However, the number of devices used is so low that it is relatively easy to select the diodes with significantly different breakdown characteristics so that in the event of simultaneous enablement of more than one device the one with the most advantageous characteristics can seize control and lock out all of the other devices in the manner described. Such selective design is not usually practical for applications requiring large numbers of devices in a set of branch paths.

It is, therefore, one object of the invention to improve circuits for selecting for operation a single one of a plurality of enabled negative resistance device circuits.

It is another object of the invention to operate large numbers of negative resistance devices in parallel circuit paths wherein a plurality of such devices may be simultaneously enabled but only one of such devices will be selected for operation.

A further object is to improve lockout circuits using negative resistance devices.

These and other objects of the invention are realized by detecting current flow in at least one of a plurality of negative resistance device circuits and initially thereafter limiting the magnitude of such current to a level which is no greater than a current level adequate to sustain conduction in any single one of said devices only. After a predetermined time subsequent to initiation of current flow, the limiting means are disabled and a much larger current flows with a magnitude which would be adequate to sustain many negative resistance devices. However, by that time all but one of the plural negative resistance devices are locked out by the one conducting device.

It is one feature of the invention that each negative resistance device is coupled to a different electric circuit to be partially enabled for conduction by a change in the signal condition on its circuit, and all of the devices are coupled to encoding means for producing a unique code representation identifying the one conducting device and its corresponding electric circuit.

It is another feature that each of the negative resistance devices is coupled to its individual electric circuit and to the encoding circuit by means which enable the device in response to an electric circuit signal condition change from either one of a first or a second signal condition to the other one thereof.

Another feature is that control means provide an additional enabling signal to all of the partially enabled devices and the control means are disabled upon each operation of the aforementioned encoding means.

Still another feature is that the control means are actuated each time that it is desired to check all of the electric circuits for a change in signal condition thereof and all of such circuits are simultaneously so checked; but if plural circuits have been subjected to a change in signal conditions at the time of the simultaneous check, only one is identified by the encoding means. In one embodiment the check is automatically repeated until no further circuits with changed signal conditions are identified.

Yet another feature is that in applications with large numbers of devices distributed impedance effects among the various device circuits are reduced by including an overdamping resistance in a common enabling circuit connection for all of the devices during the time of conduction of the single sustaining current.

A feature of one embodiment is that *n*-out-of-*m* decade encoding is used in the aforementioned encoder in order to impose uniform loading on all of the negative resistance device circuits.

An additional feature is that the invention is useful in communications line concentrator applications for accomplishing a rapid scan-type check of plural line conditions without allocating a separate scan time interval for scanning each line and comparing the condition of such line with its last previous condition.

A more complete understanding of the invention and its various features, objects, and advantages may be obtained from the following detailed description when considered in connection with the appended claims and the attached drawing in which:

Figure 1:
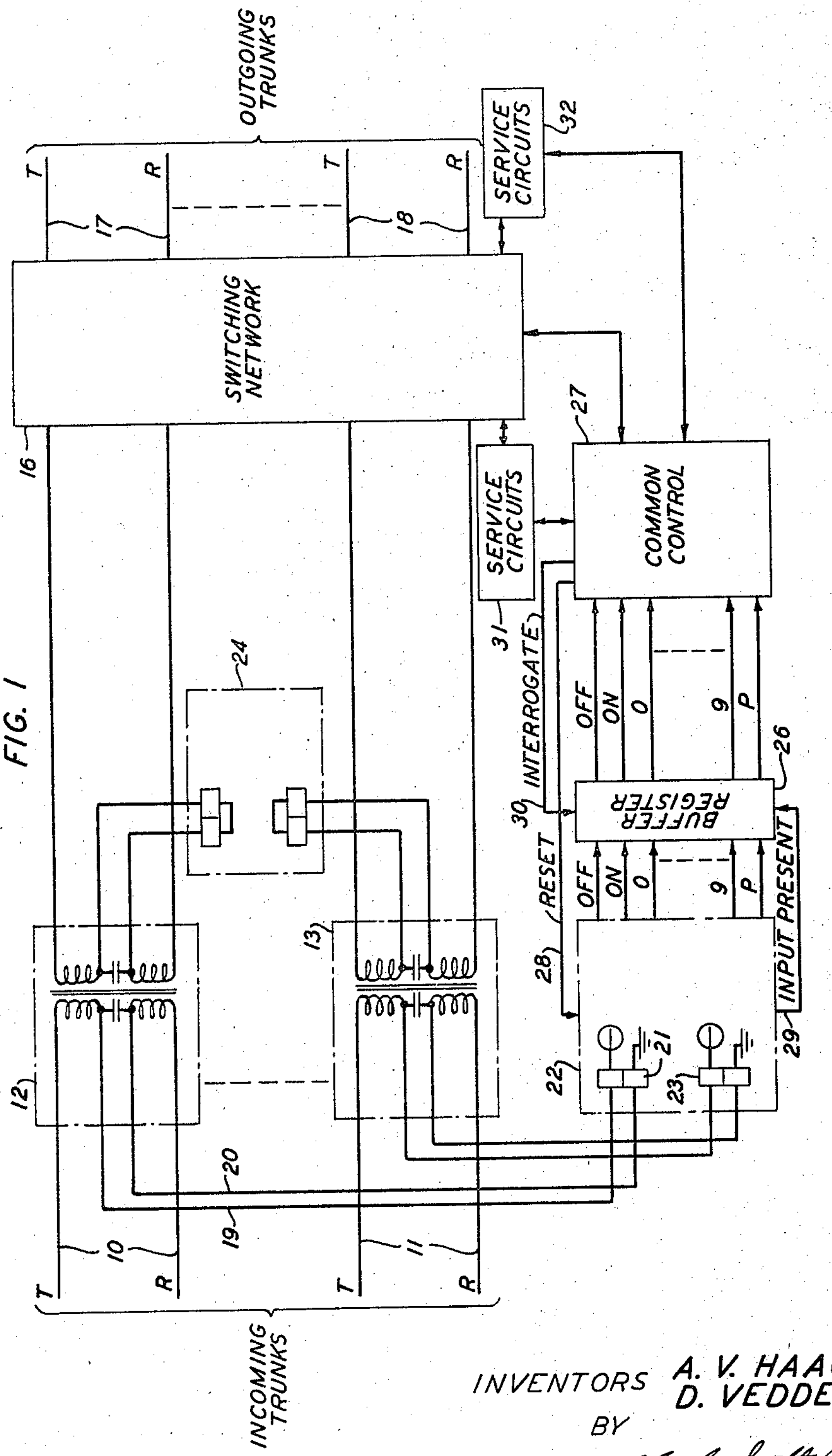
FIG. 1 is a simplified diagram, partly in block and line form and partly in schematic form, of telephone office circuits utilizing the invention in a line concentrator.

FIG. 1 illustrates relevant portions of telephone office circuits using a line concentrator of a type to which the present invention is advantageously applied. The invention is not, however, limited to such applications. Two trunk circuits 10 and 11 of a plurality of incoming trunks from another telephone office are connected to repeater coils 12 and 13 of a conventional type. The output sides of the repeater coils 12 and 13 are coupled through a switching network 16 for connection to different ones of a plurality of outgoing trunks. Only two outgoing trunks 17 and 18 are illustrated. The tip and ring conductors of the incoming trunk 10 are coupled through the repeater coil 12 and leads 19 and 20 to the two halves of the operating windings of a relay 21 in line concentrator circuit 22. The two conductors of the incoming trunk 11 are similarly connected to the two halves of the operating windings of a relay 23, and other trunks and concentrator relays, not shown, are similarly connected. Within the concentrator each relay has one of its windings connected between ground and the ring side of an incoming trunk circuit while the other winding of the same relay is connected between a negative potential source and the tip side of the same incoming trunk circuit. Potential sources are throughout the drawings in this application indicated by a circled polarity sign at the circuit point to which a direct potential source terminal of the indicated polarity is connected. A source terminal of the opposite polarity, not shown, is understood to be connected to ground.

The concentrator is adapted in accordance with the invention, and in a manner which will be hereinafter described in detail, to check for changes in trunk direct-current signal conditions. The concentrator responds to both the energization and the de-energization of one of its illustrated relays for producing an output signal code representation indicating which of the incoming trunks was subjected to a signal change which caused a corresponding change in the state of the concentrator relay. Such signal change may be caused, for example, by the closure of relay contacts at a sending station, not shown, upon trunk seizure. That closure shorts together the tip and ring conductors of the incoming trunk 10, for example, to the illustrated office circuits. This contact closure provides a closed direct-current circuit path from the negative potential source to ground through both halves of the relay 21 in concentrator 22 thereby actuating that relay and causing its contacts to be operated in a manner to be described. The relay is thereafter alternately released and actuated by operation of dial contacts during dialing, and it is ultimately released by the opening of sending station relay contacts upon release of the trunk.

The illustrated concentrator 22 produces a plurality of outputs to buffer register 26, and these outputs indicate in binary coded form the name of the trunk which was subjected to a signal change as well as indicating whether the trunk is in an on-hook or an off-hook condition after the signal change. An additional concentrator output P is a parity bit for a purpose to be described. The buffer register 26 provides similar output connections to a common control 27 which operates the central office equipment automatically in accordance with a stored program as is known in the art. When the common control directs that the incoming trunks be scanned for changes in signal condition thereon, a reset signal is coupled on a lead 28 from common control 27 to the concentrator 22 for initiating the incoming trunk scanning operation therein. However, such a scanning operation does not take the usual form wherein the condition of each trunk is surveyed in a step-by-step fashion from a time standpoint through the full array of incoming trunks. It is instead a simultaneous check imposed upon all incoming trunks at the same time in a manner which will be hereinafter described.

When the concentrator 22 detects a change in input trunk signal condition it supplies an INPUT PRESENT signal on a lead 29 to the buffer register 26. The common control 27 acts after it has produced its reset signal on circuit 28 to produce an interrogation signal on a circuit 30 to the buffer register 26. Within that register the INPUT PRESENT signals on lead 29 and the interrogation signal on lead 30 are ANDed together for causing the buffer register to read out the information that it has received from the concentrator to the common control 27. The common control responds to such signals from the register 26 to actuate service circuits 31 and 32 and the switching network 16 for achieving the necessary interconnection of incoming and outgoing trunk circuits, or of a trunk circuit with appropriate supervisory circuits as is well known in the art.

Concentration similar to the concentrator 22 may also be used for checking conditions on other groups of circuits. For example, a concentrator 24 is indicated for checking conditions on the outgoing side of the repeaters. In this case the concentrator relays have their windings strapped in series because they receive operating potential from another office via the outgoing trunks and the switching network 16.

Figure 2:
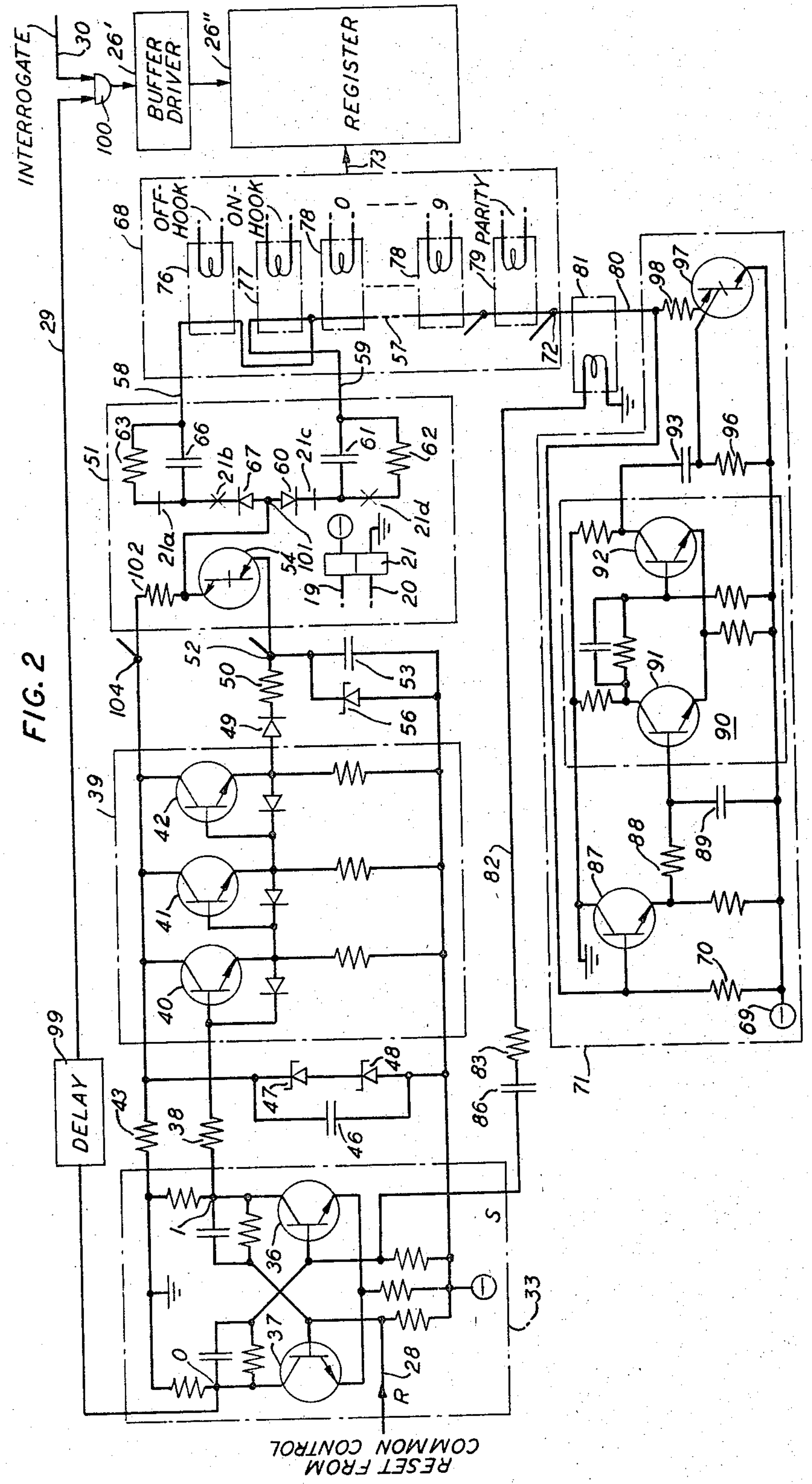
FIG. 2 is a partial schematic diagram of the line concentrator of FIG. 1.

Relevant details of the concentrator 22 are illustrated in FIG. 2. The reset signal on lead 28 is a positive-going pulse and causes a bistable multivibrator circuit 33 to be triggered so that its transistor 37 is driven into conduction, and its transistor 36 is biased to a nonconducting condition. The multivibrator has a conventional circuit format with positive-going input signals being applied to the base electrodes of the transistors 36 and 37 to trigger the multivibrator to its set and reset conditions, respectively. The binary ONE output of the control flip-flop circuit 33 is positive-going in the reset condition and is coupled through a resistor 38 to drive a gate circuit 39 into conduction for producing an amplified current pulse at the output thereof. Gate circuit 39 includes three transistors 40, 41, and 42, each of which is connected in an emitter-follower circuit, and all such circuits are arranged to be driven in tandem by the output of the flip-flop circuit 33. These emitter-follower circuits in the gate 39 are advantageously provided with operating potential from the same source as is the flip-flop circuit 33 through a dropping resistor 43. A bypass capacitor 46 keeps alternating current signal components out of the direct potential source and two reverse breakdown diodes 47 and 48 are connected in series across the capacitor 46 for providing a regulated potential to the gate 39 and to other circuits to be described. Each of the three transistors in gate circuit 39 has a diode connected between its base and emitter electrodes to provide reverse voltage breakdown protection for the base-emitter junctions of such transistors in a well known manner.

The emitter electrode output of the last stage transistor 42 in gate 39 is coupled through a blocking diode 49 and a resistor 50 to a plurality of trunk diode circuits 51, only one of which is illustrated in the drawing. This signal provides partial enabling potential for a PNPN diode 54 in each circuit 51. The connection to other ones of the diode trunk circuits 51 is schematically indicated by a short diagonal line at a common circuit junction 52 between the resistor 50 and the illustrated circuit 51. When gate 39 is turned on all of its transistors are driven into conduction, and the resulting amplified, positive current pulse at the gate output is coupled through the diode 49 and the resistor 50 to charge a capacitor 53. The maximum potential difference which can be stored on the capacitor 53 is limited in a manner which will be described by a reverse breakdown diode 56 which is connected across such capacitor.

Each of the diode trunk circuits 51 includes a different one of the concentrator relays hereinbefore mentioned in connection with FIG. 1. The relay 21 is associated with the circuit 51 which is illustrated in FIG. 2, and that relay is coupled to the incoming trunk circuit 10, as previously described. The relay 21 controls the operation of a plurality of contacts 21_a_ through 21_d_ for regulating the connection to diode 54 of an individual circuit 57, in an encoder 68, through two branch circuits 58 and 59. When relay 21 is de-energized its normally closed contacts 21_c_ connect the diode 54 and a steering diode 60 in series in the branch circuit 59 between the circuit 57 and the common junction 52. At the same time the normally open contacts 21_d_ are open so that a capacitor 61 is included in the branch circuit and a resistor 62 is excluded therefrom.

Also at the same time the contacts **21*a* are closed so that a resistor 63 and a capacitor 66 are connected in parallel in the branch circuit 58, but such branch circuit is disconnected from the diode 54 by the normally open contacts 21*b*. Resistor 63 dissipates any charge theretofore accumulated on capacitor 66**.

Upon energization of relay 21 its contacts **21*b* are closed to connect the capacitor 66 in series with a further steering diode 67 in the branch circuit 58 between the individual circuit 57 and the PNPN diode 54. At this time the contacts 21*a* are opened to disconnect the resistor 63, and the contacts 21*c* are opened to disconnect the branch circuit 59. Contacts 21*d* are closed to connect resistor 62 in parallel with capacitor 61 for dissipating any charge theretofore accumulated. The individual circuit 57 is at all times connected through an encoder 68 to a source of negative potential 69 through a current limiting resistor 70 in a current control circuit 71. Source 69 is the same negative source also represented in flip-flop circuit 33. Other individual diode trunk circuits 51 associated with different ones of the incoming trunks in FIG. 1 are similarly coupled by their respective branch circuits 58 and 59 and individual circuits 57 to the current control circuit 71 which is common to all of such diode circuits. All of the individual circuits 57 are connected in multiple at a common circuit junction 72** as indicated schematically by the short diagonal line at that junction.

It will be observed from the connections already described for each of the diode trunk circuits 51 that when one of the branch circuits, e.g., the branch circuit 58, is disconnected from the diode 54 by the contacts of the relay 21, its capacitor 66 is enabled to discharge through the parallel connected resistor 63. However, when the branch circuit is connected to the diode only the capacitor, and not its associated resistor, is included in the branch circuit. When so connected, the capacitor is charged at certain times, to be described, by conduction through the encoder 68, current control circuit 71, capacitor 53, and diode 54 to impose a reverse bias on diode 54. Thus, each time the relay 21 changes from its energized to its de-energized state, or vice versa, a discharged capacitor is coupled in the branch circuit which is connected in series with the diode 54, and the previously charged capacitor of the trunk diode circuit is connected across its associated resistor to be discharged. Consequently, each time the direct-current signal condition on an incoming trunk circuit is changed a discharged capacitor replaces a charged capacitor in the circuit of the diode 54 so that the reverse bias applied by the charged capacitor is removed and the diode is thereby partially enabled.

The encoder 68 includes a plurality of linear transformer cores each having individual significance and to different combinations of which the branch circuits 58 and 59 and the individual circuits 57 of the various diode trunk circuits 51 are connected. Each transformer includes an output winding for applying signals coupled thereto from the diode trunk circuits 51 to the register 26″ in the buffer register 26 as indicated schematically by the single lead 73. Within encoder 68 a core 76 is coupled to all of the branch circuits 58 for indicating the off-hook condition on any corresponding trunk circuit, and similarly a core 77 is coupled to all of the branch circuits 59 for indicating an on-hook condition on any corresponding incoming trunk circuits. Ten cores 78, only two of which are shown, are coupled to the various individual circuits 57 in different combinations for indicating in binary coded form the code name representation of a selected one of the incoming trunk circuits. This type of encoding wherein a single input pulse produces a multibit binary coded output signal is known in the art.

An additional transformer core 79 is coupled to only those ones of the leads 57 which are also coupled to an odd number of the cores 78. The core 79 provides a parity indication for use by the common control 27 in FIG. 1. All of the leads 57 which link an even number of the cores 78 bypass the parity core 79 and are coupled directly to the common junction 72. In certain data processing equipment of the type that is used for common control purposes, as is known in the art, it is necessary that a word with even parity be provided. Consequently, the core 79 adds an additional binary ONE to any code representation to be read from the encoder 68, which otherwise includes an odd number of binary ONE bits.

A circuit 80 interconnects the common junction 72 and the current control circuit 71, and circuit 80 is also coupled to an additional linear transformer core 81. The output winding on the core 81 produces an electric signal each time that the encoder transformer cores are actuated and such signal is coupled through a lead 82, a resistor 83 and a capacitor 86 to the set input connection of the flip-flop 33. That signal sets the flip-flop and thereby disables gate 39 to terminate the charging of capacitor 53. This assures that conduction in the diode 54 will be disabled if it had not theretofore been disabled by the accumulation of charge in one of its branch circuit capacitors.

The resistor 70 in current control circuit 71 is a current limiting resistor. Its resistance has a value which is adapted to limit initial current flowing in the common circuit portions of the concentrator in FIG. 2 to a level which is adequate to sustain conduction in the PNPN diode 54 in only one of the diode trunk circuits 51. Since such diodes have certain manufacturing tolerances on the sustaining current characteristics thereof, it is necessary that the resistor 70 be adapted to limit total current initially to a level which is adequate to sustain the one of the diodes 54 which has the largest sustaining current characteristic.

When a diode 54 has been partially enabled by the connection of a discharged branch capacitor to one electrode thereof and further partially enabled by the application of forward breakdown voltage to the other electrode thereof from capacitor 53 and resistor 50 in response to the reset pulse on lead 28, the aforementioned initial current flows. That current flows in the previously described charging path for a branch circuit capacitor and it includes the resistor 70. This initial current is limited, as aforesaid, to the magnitude of a single sustaining current for a PNPN diode so that plural voltage-enabled diodes 54 must share such current. The potential difference developed by such current across the resistor 70 biases a transistor 87 into conduction in an emitter-follower circuit. The emitter electrode of that transistor is coupled through an integrating circuit including a resistor 88 and a capacitor 89 to trigger a monostable threshold circuit 90 after a sufficient charge has been built up across the capacitor 89.

However, prior to the time-out of the integrating circuit plural enabled diodes 54 vie for control of the single sustaining current that is available. A relaxation type of operation takes place among diodes with similar sustaining current requirements. The diodes oscillate rapidly on and off accumulating stored charges to make it easier to turn on in each succeeding cycle. Ultimately one is able to preempt the available current to achieve stable conduction and lock out all of the others. It is assumed that the illustrated diode 54 for trunk 10 is the one so controlling the lockout.

After lockout, monostable circuit 90 is triggered. The circuit 90 includes two transistors 91 and 92 arranged in a conventional Schmitt trigger circuit wherein the transistor 92 is normally conducting in the stable condition of the circuit. The triggering of circuit 90 by the potential developed across capacitor 89 transfers conduction from transistor 92 to transistor 91 in a well known manner for such circuits and thereby produces a positive-going potential at the collector electrode of transistor 92. The latter potential is coupled by a capacitor 93 to develop a potential difference across a shunt-connected resistor 96 for biasing a PNPN triode 97 into conduction.

The triode 97 is connected in series with a resistor 98 between circuit 80 and the negative potential source 69. Resistor 98 has a much lower resistance than does the resistor 70 so that the resistor 98 is the principal factor controlling current in the single diode 54 controlling the lockout when the triode 97 is conducting. The resistor 98 has a magnitude which permits current flow in that diode 54 at a level which is much higher than the sustaining current level thereof and which typically would be adequate to provide sustaining current for a large number of such diodes. However, the conduction of diode 54 develops such a small potential difference between the common junctions 52 and 72 that the corresponding diodes in all other diode trunk circuits 51 are disabled for lack of breakdown voltage. This large current pulse flowing in the individual circuit 57 of the illustrated diode 54 is coupled through the various transformer cores of the encoder 68 to produce an output to register 26″ through each transformer core which is linked by such circuit 57. The encoder outputs now are of adequate magnitude to actuate the register for storing therein the corresponding encoder indications. Such indications in the register 26″ are thereafter utilized to advise common control 27 whether the signal condition on the incoming trunk 10 of FIG. 1 represents an on-hook or an off-hook condition and also to show in binary coded decimal form that it is the incoming trunk 10 which has a changed signal condition thereon and which has been recognized by the selection circuits of FIG. 2 for service.

The same high current pulse which actuated encoder 68 as just described is also coupled through the trigger core 81 to set the flip-flop circuit 33. The corresponding binary ZERO output at the collector electrode of transistor 37 in the flip-flop circuit is coupled through a delay circuit 99 of any suitable type known in the art to the circuit 29 for application to an AND gate 100. The AND gate 100, which also may be of any suitable type known in the art, also receives the interrogate signal on circuit 30 from common control 27. Coincidence of the signals on circuits 29 and 30 actuates the gate 100 for actuating in turn the driver 26′ of buffer register 26. The signal applied from driver 26′ to register 26″ causes that register to read out to the common control 27 as previously described in connection with FIG. 1. The delay 99 is provided to cooperate with the gate 100 for inhibiting interrogation of the buffer register for a brief interval after the aforementioned high current pulse in the circuit 57 in order to assure complete storage in the register 26″ of the information coupled from encoder 68 before such register is caused to read out to common control.

The high current pulse which occurs in the individual circuit 57 after triode 97 has been switched into conduction charges the connected branch circuit capacitor in the diode trunk circuit 51 in a direction which tends to apply a reverse bias to the diode 54 therein. During this pulse approximately half of the initial charge that was in capacitor 53 is transferred to the branch circuit capacitor in the circuit 51. The aforementioned trigger pulse from the trigger core 81 disabled gate 39 and thereby prevented further charging of capacitor 53. The diode 49 also blocks discharge of the capacitor 53 through the output circuits of the gate 39. After approximately half of the charge on the capacitor 53 has been transferred there is insufficient potential difference across diode 54 to maintain current flow at the sustaining current level, and the diode is thereby restored to a stable nonconducting condition.

After diode 54 turns off the charge that remains on the connected branch circuit capacitor is held there indefinitely until a further signal change on the corresponding incoming trunk circuit connects a discharge resistor to such branch circuit capacitor. It is, of course, known that a charge placed on a capacitor in an electric circuit can gradually leak off through various distributed impedance paths at a very low rate. In order to offset this effect, a common junction 101 between the branch circuits 58 and 59 and one terminal of the diode 54 is also connected through a high resistance, represented by a resistor 102, to ground. Thus a high resistance trickle charging path is established for the charged branch circuit capacitor from ground through a common circuit junction 104, the resistor 102 in each circuit 51, the connected one of the two branch circuits, the corresponding circuit 57, resistor 70, and the negative potential source 69. Resistor 98 does not enter into this trickle charging path because the switch 97 was restored to its nonconducting condition either by timeout of the integrating circuit 88, 89 or by reduction of current flow therethrough below the sustaining current level for such triode. Thus the branch circuit capacitor is kept charged indefinitely.

If prior to a further change in the state of the illustrated relay 21 the common control 27 calls for a further scanning operation by setting the flip-flop 33, the resulting positive pulse appearing at common junction 52 is unable to disturb the condition of the illustrated diode 54 because it is of insufficient magnitude to overcome the combined effects of the breakdown threshhold voltage of the diode and the reverse bias imposed on the diode by the charged branch circuit capacitor.

The resistor 50 and the capacitor 53 are arranged to have a time constant which permits that capacitor to be charged rapidly to substantially the full output voltage from the gate circuit 39. However, the rate of charge is slow enough to prevent the dynamic breakdown characteristics of the PNPN diode 54 from becoming effective as is known in the art to bias a diode into conduction at a voltage which is much lower than its normal static forward breakdown voltage.

It has been hereinbefore noted that the reverse breakdown diode 56 which shunts the capacitor 53 limits the maximum potential which can be accumulated on such capacitor. This limitation is necessary to prevent spurious operations of diodes 54. By utilizes such a limiting device, the maximum charge on capacitor 53 is fixed and the various circuit time constants during the conduction interval of the triode 97 in current control circuit 71 become noncritical. Thus, during such interval approximately half of the charge on capacitor 53 is shifted into the conducting branch circuit capacitor. When the charge shift has been completed the diode 54, which is connected between the two capacitors, is biased to its nonconducting state for lack of sustaining current and thereby terminates further charge transfer. It is the function of diode 56 to limit the maximum charge on capacitor 53 so that when half of such charge has been transferred to a branch circuit capacitor there will be insufficient charge remaining on capacitor 53 to break down another one of the diodes 54 in a different diode trunk circuit 51. In like fashion the time constant of resistor 50 and capacitor 53 must be kept sufficiently low so that capacitor 53 is adequately charged on each scan request signal in order that the charge imposed upon a conducting branch circuit capacitor in circuit 51 will not be too small. If such charge were too small it would be possible for its corresponding diode 54 to be biased into conduction during a later scan interval without the necessity for a change in the state of the corresponding relay.

Thus, in connection with FIG. 2, each time that the common control requests a scanning operation the circuits illustrated simultaneously check the conditions of all trunk diode circuits which are coupled to the common junction 52. If any one of those trunk diode circuits has a branch capacitor therein in a discharged state connected to its PNPN diode 54 it is known that the signal condition on the corresponding incoming trunk circuit had changed since the last scanning operation. Assuming that plural diodes 54 had been enabled prior to the scan request signal, each of them tries to take the full single sustaining current magnitude which is then avialable through the resistor 70. Depending upon the characteristics of the individual diodes which are at that time enabled, one of them may immediately seize full control of the sustaining current or more than one of the diodes may oscillate back and forth in a temporary unstable condition until one of them seizes control of the single sustaining current and thereby locks out the others. Thereafter the integrating circuit 88, 89 times out and causes trigger circuit 90 to actuate the switch 97 to cause a large current pulse to flow through the controlling one of the diodes 54. The same pulse in the corresponding individual circuit 57 produces an identifying signal to the register 26''.

In a typical telephone system the common control 27 is programmed so that after each of its register interrogating signals which produced trunk identification signals, it immediately produces another reset signal on lead 28 to call for a further scan to see whether or not there are additional enabled diode trunk circuits 51 awaiting service. If the further scan request indicates that there was a further enabled diode trunk circuit, its associated trunk is identified in the fashion already described; and further scan requests are generated until such time as no enabled diode trunk circuits 51 are found. When the latter condition is detected, there is no triggering of the triode 97 because no initial current flow is detected in the limiting resistor 70 by the emitter follower circuit of transistor 87. Likewise there is no setting signal generated by the trigger core 81 to set the flip-flop circuit 33.

Accordingly, gate circuit circuit 39 remains in its conducting condition and holds the maximum charge potential on capacitor 53 indefinitely. Common control 27 continues in its program and provides the interrogation signal on lead 30 but when that interrogation signal produces no output from register 26'' the common control resumes its regular program. If now prior to a further scan request signal an incoming trunk circuit is subjected to a signal condition change, the corresponding concentrator relay is caused to change state and connect a discharged branch circuit capacitor 61 or 66 to the diode 34. The charge on capacitor 53 immediately triggers such an enabled diode and causes the remaining circuits of FIG. 2 to operate as hereinbefore described for registering the identifying information of the trunk circuit in the register 26''. The flip-flop circuit 33 is now also set.

Common control 27 is normally programmed to initiate scanning operations at certain prescribed intervals and in so doing it first interrogates the register 26'' to determine whether or not there is information resting therein which has been generated subsequent to termination of the last previous scanning operation. Thereafter it initiates a sequence of scan request signals in such number as may be required, as previously described.

Typically a new set of scanning operations is initiated at about 10 milliseconds, and the one scan-type check cycle requires only about 80 microseconds. Accordingly, many trunks actually awaiting service can be readily serviced in a single set of checks if they should be simultaneously waiting, and hundreds of trunks can be accommodated at a single scan point 52 because only a small proportion of the whole number of trunks would be seeking services at the same time. The trunk associated with the diode 54 which has the largest sustaining current requirement is, therefore, assured of service in a single set of scan checks even though it must wait momentarily for trunks with lower sustaining current requirements to be recognized.

It has been heretofore noted that after one scanning operation and before a further scanning operation is initiated a trunk circuit signal change may cause a trunk identification code to be stored in register 26''. A plurality of such registers may be provided in tandem in a manner known in the art to store a plurality of trunk identification codes during the time between full scanning operations and thereby reduce the number of trunk circuits that could be queued awaiting service at the beginning of a scanning operation. It can be shown that the statistical probability of erroneous multiple diode selection is thereby reduced. In such tandem register arrangements, when the output register has been interrogated by common control the contents of the other registers are shifted by one register thereby clearing the input register and placing a new word in the output register for interrogation.

Figure 3:
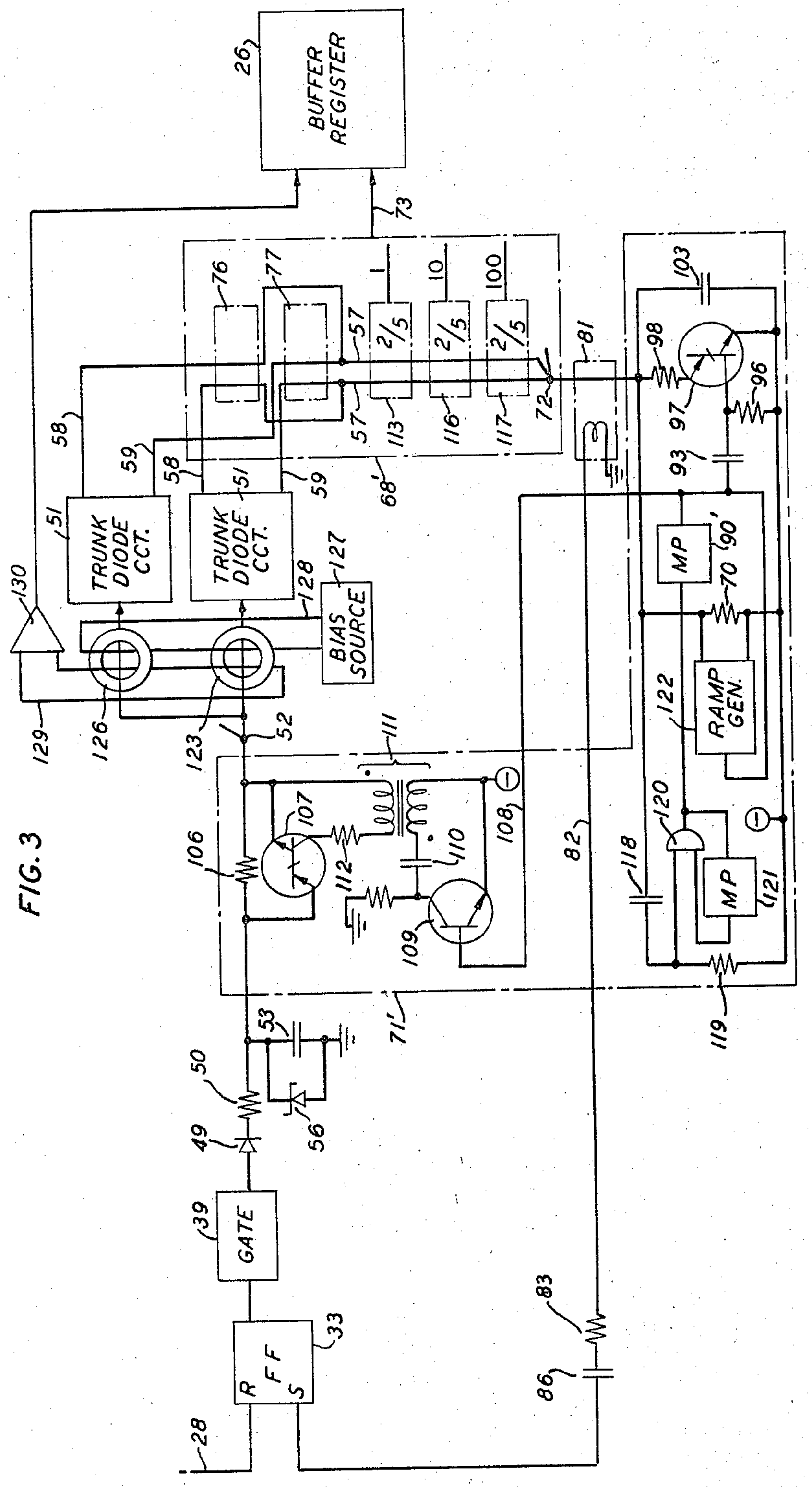
FIG. 3 is a diagram, partially in block and line form and partially in schematic form, of a modification of the line concentrator embodiment of FIG. 2.

The circuits in FIG. 3 represent a modified application of the invention to a line concentrator circuit, and circuit elements corresponding to those shown in FIG. 2 are indicated in FIG. 3 by similar reference characters. Certain of the changes in the circuit of FIG. 3 have been made to facilitate the application of the invention to systems which utilize such a large number of circuits to be scanned that the distributed impedance effects among the individual circuits 57 become significant. For example, the distributed capacity among the circuits 57, and between such circuits and ground, can resonate with the inductance of the transformer cores in the encoder 68' and cause ringing effects to be superimposed upon the voltage applied to the trunk diode circuits. These superimposed ringing effects appear primarily before lockout has been effected and prior to the time of the high current pulse when triode switch 97 is conducting. Consequently, such ringing adversely affects the time required to select a single diode, and it also causes erratic selection that may permit more than one diode to conduct during lockout.

In FIG. 3 a capacitor 103 is connected across the series combination of resistor 98 and triode 97 to represent schematically the aforementioned distributed capacitances. Capacitor 103 also represents additional lumped circuit capacitance added at the point illustrated in order to make the total capacitance much larger and thereby facilitate overdamping of the circuit for the initial diode sustaining current. In addition, a resistor 106 is connected in series between the resistor 50 and the common circuit junction 52 to raise the total resistance of the sustaining current path to an overdamped impedance level, thereby suppressing such ringing effects. The current control circuit 71 includes circuitry for shunting out the resistor 106 after the time of initial current flow and when the switch triode 97 is conducting.

An additional PNPN triode 107 is connected to shunt the resistor 106 and its control electrode is coupled to the output of a conventional monopulser 90'. In the embodiment of FIG. 3 the monopulser 90' is triggered upon the initiation of current flow in resistor 70, as will be hereinafter described. The triggered monopulser produces a ground output signal which is coupled by a lead 108 to bias the transistor 109 to a nonconducting condition thereby generating a positive-going signal at the collector electrode thereof. A capacitor 110 couples this positive-going signal to the primary winding of a transformer 111 as indicated by the dot convention markings adjacent to the primary and secondary windings of transformer 111. The positive-going voltage is coupled through the transformer and a current limiting resistor 112 as a negative-going voltage at the control electrode of the triode 107 so that the triode remains in a nonconducting condition.

However, when the monopulser 90' has timed out, the positive-going voltage at its output biases transistor 109 into conduction thereby producing a negative-going signal which is coupled through transformer 111 as a positive-going signal at the control electrode of the triode 107. That triode is biased into a conducting condition for shorting resistor 106. The same resetting of monopulser 90' also actuates triode 97 to shunt resistor 70 and produce the high current pulse. Thus, the resistor 106 provides its overdamping during the interval when the diode sustaining current is initially conducted by a diode trunk circuit 51.

An *n*-out-of-*m* encoding technique is employed in the encoder 68' instead of the binary coding technique utilized in FIG. 2 to improve circuit operation. Linear transformers are again employed in the encoder 68′, and in the illustrative example in FIG. 3 fifteen such transformers are provided in three five-transformer groups 113, 116 and 117. These fifteen transformers are grouped to provide three decades of 2-out-of-5 coding. Each of the individual circuits 57 from the trunk diode circuits 51 links only two of the transformer cores in each of the three core groups. Consequently, each such circuit is subjected to uniform inductive loading in the encoder, thereby causing the high current pulse to have the same magnitude regardless of which trunk is identified by the encoder.

It is not necessary to provide in FIG. 3 the parity core which was included in the encoder 68 of FIG. 2 because a different type of error control arrangement is required in common control 27 when 2-out-of-5 coding is employed.

In the current control circuit 71 the monopulser 90′ is initially triggered in a somewhat different fashion than is the trigger circuit 90 in FIG. 2. Thus, a differentiating circuit including a series capacitor 118 and a shunt resistor 119 is employed to couple potential difference changes from the resistor 70 to the input of a conventional AND logic gate 120. That gate is normally enabled by the output of a further monopulser 121 resting in its stable condition prior to a scanning operation. A positive-going voltage transistor across the resistor 70 is coupled through the enabled gate 120 to trigger monopulser 90′ for operation in the manner previously described with respect to FIG. 3. That monopulser 121, which is also triggered by the output of gate 120, has a time constant which causes it to operate in its unstable operating condition for a somewhat longer interval than does the monopulser 90′. That output of monopulser 121 in its unstable condition disables gate 120. Consequently, any signal transients, which may be produced in the limiting resistor 70 when triode 97 is triggered into conduction upon the resetting of monopulser 90′, are unable to effect a further triggering of the monopulser 90′.

A further modification of the current limiting circuit 71′ is also indicated in FIG. 3. This modification includes a ramp current generating circuit 122 which is triggered into operation by the initial triggering of monopulser 90 to provide a variable impedance shunt around the limiting resistor 70. That shunt causes the initial limiting effect of the circuit 71′, prior to the triggering of the triode 97, to vary the current with respect to time in an individual circuit 57 from a level which is lower than the lowest sustaining current level of any diode in the trunk diode circuits 51 up to a level which is at least equal to the sustaining current level of the diode of a trunk diode circuit which has the highest sustaining current. Details of this modification of the current control circuit 71′ are disclosed and claimed in the copending application Ser. No. 481,831 of M. L. Embree, A. V. Haag, and D. Vedder filed on even date herewith and entitled "A Ramp-Controlled Selection Circuit for Simultaneously Enabled Negative Resistance Devices." The purpose of the ramp generator modification of the current control circuit is to vary the sustaining current magnitude through the range of sustaining current characteristics utilized in the various trunk diode circuits to facilitate the selection of a single one of such circuits from a group with a broader sustaining current range than is otherwise possible.

It is always possible in lockout circuits that true lockout may not actually be achieved. Considering this possibility additional circuits are provided in FIG. 3 for detecting the failure of lockout and advising common control of the condition so that erroneous operations are terminated at an early stage. For this purpose a different bistable magnetic device is coupled to each of the individual trunk diode circuits 51, two of which are shown in FIG. 3. Such devices are illustrated in the form of the toroidal cores 123 and 126. Each of these cores has a substantially rectangular hysteresis characteristic defining two stable conditions of remanent flux density of opposite polarity. A bias current source 127 has its output coupled by a circuit 128 to each of the toroidal cores for biasing such core toward a stable condition which is of opposite polarity with respect to the condition towards which such core is switched by a pulse from the capacitor 53. The bias is of such magnitude that if a single trunk diode circuit is ultimately selected during the sustaining current interval prior to the triggering of the triode 97, the corresponding toroidal core is switched by the high current pulse that follows. This switching is detected by a sensing circuit 129, and the induced signal therein is coupled through an amplifier 130 to actuate a stage of buffer register 26. Subsequently, when that register is interrogated by common control 27 it indicates that one of the trunk diode circuit check cores was switched and that all seems well insofar as the lockout function is concerned.

When the diode of the activated trunk diode circuit has been restored to its nonconducting condition as previously described, no current flows from common junction 52 to such trunk diode circuit, and the bias source 127 regains control of the check cores to bias them back to their normal biased stable condition.

However, if more than one trunk diode circuit is selected, and at least two of them are in stable conduction, the current applied from the capacitor 53 splits at the common junction 52. A portion of the current is coupled through the check cores to each of the trunk diode circuits that is conducting. However, the split current portions of the total current are unable to overcome the bias on such cores, and consequently none of the check cores is switched. The absence of an output from the sensing amplifier 130 causes the buffer register to indicate to the common control 27 that all is not well insofar as lockout is concerned. Consequently, the next succeeding output from the encoder 68′ is assumed to be incorrect because it would have been produced by high current pulses flowing through more than one trunk diode circuit so that the encoder output signal representation of a trunk name would be incorrect.

Although this present invention has been described in connection with particular embodiments thereof, it is to be understood that additional embodiments which will be obvious to those skilled in the art are included within the spirit and scope of the invention.

What is claimed is:

1. An asynchronous concentrator for plural input circuits which comprises a plurality of negative resistance asymmetrical conduction devices, means enabling a different one of said devices for conduction in response to predetermined signal condition changes on each different one of said input circuits, means applying conducting bias signals to a first electrode of all of said devices, means comprising a return circuit for coupling a second electrode of all of said devices to said applying means, said coupling means including means limiting device current to a level which is adequate for sustaining conduction in only one of said devices, means coupled to said return circuit for identifying the input circuit associated with a conducting device, and means overriding said limiting means to increase device current at a predetermined time after the initiation of current flow for actuating said identifying means.

2. In combination, a plurality of negative resistance devices each connected in an individual electric circuit, each of said devices requiring a predetermined minimum voltage to initiate conduction therein and further requiring a predetermined minimum current to sustain conduction therein after initiation of current flow, a common electric circuit to which all of said individual electric circuits are connected, means in said common electric circuit enabling at least two of said devices for conduction at a current level in excess of the sustaining current level thereof, and means in said common circuit limiting current magnitude therein to a level which is adequate to sustain only one of said devices, said limiting means being operative for a predetermined time to permit only one of said enabled devices to take the full sustaining current and thereby to cause the remaining ones of said enabled devices to lapse into a nonconducting condition.

3. The combination in accordance with claim 2 in which said negative resistance devices are PNPN semiconductor diodes.

4. The combination in accordance with claim 2 in which each of said devices has a different code name representation, and a common code name register is coupled to each of said individual circuits for registering the code name representation of said one enabled device.

5. The combination in accordance with claim 4 in which a plurality of linear transformer cores is provided for coupling said register to said individual circuits, and each of said individual circuits links a different combination of said linear transformer cores for activating said register in accordance with a binary coded decimal representation of the code name of the one of said devices to which such individual circuit is coupled.

6. The combination in accordance with claim 4 in which a plurality of linear transformer cores are provided for coupling said individual circuits to said register, said transformer cores are arranged in plural groups of *m* cores each, each of said groups being adapted to represent a different decade in a decimal counting system utilizing an *n*-out-of-*m* code wherein *n* is smaller than *m*, and means coupling each of said individual circuits to *n* of the transformer cores in each of said transformer core groups for representing the code name of the one of said devices to which such individual circuit is coupled.

7. The combination in accordance with claim 6 in which distributed capacitances are effective among said individual circuits, said limiting means includes lumped capacitance of such magnitude that the effect of the total capacitance of said lumped capacitance and said distributed capacitance is much greater than the total inductive effect of said transformer cores on said individual circuits, a resistor is included in said common electric circuit and has a resistance magnitude adapted, together with said inductive effect and said capacitances, to cause the total impedance of said common electric circuit and said individual circuits to be overdamped, and means coupled to said limiting means for short-circuiting said resistor subsequent to said predetermined time.

8. The combination in accordance with claim 2 in which a bistable magnetic device is coupled to each of said individual circuits to be switched to a first one of the stable conditions thereof in response to current flow at said excess current level in such individual circuit, and means coupled to all of said bistable magnetic devices for indicating the switching of any one of said devices from one of its stable conditions to the other.

9. The combination in accordance with claim 2 in which said limiting means includes timing means responsive to the initiation of current flow in any of said devices for substantially lowering the resistance of said common circuit after said predetermined time, and means responsive to the timeout of said timing means are provided for disabling said enabling means.

10. The combination in accordance with claim 2 in which plural electric circuits are provided which are subject to either a first or a second signal condition, and said enabling means includes means coupling each of said plural electric circuits to a different one of said devices, said coupling means being responsive to a signal change from either of said first or second signal conditions to the other one of said signal conditions for enabling the corresponding one of said negative resistance devices.

11. In combination a plurality of negative resistance devices each connected in an individual electric circuit and having predetermined breakdown voltage and sustaining current characteristics, a common electric circuit to which all of said individual circuits are connected, a source of enabling signals coupled to each of said devices for partially enabling said devices in response to each of such signals, a plurality of electric circuits, means coupling each of said plurality of electric circuits to a second terminal of a different one of said devices, said coupling means including a relay connected to be actuated by the occurrence of a predetermined signal condition on its corresponding circuit and to be deenergized upon the removal of such condition, each of said individual circuits including two branch circuits coupled to said second terminal of the corresponding one of said negative resistance devices, each such branch circuit including a different resistor and a different capacitor connected in parallel, and said relay having a first set of contacts for opening a first one of said branch circuits in response to the actuation of said relay and a second set of contacts for opening the second one of said branch circuits in response to the de-energization of said relay, said relay also having additional contacts for disconnecting the resistance of a branch circuit that is otherwise connected to said device.

12. The combination in accordance with claim 11 which includes in addition a potential source, and a plurality of resistors, each of said resistors connecting said potential source to said second terminal of a different one of said devices for maintaining the charge condition of a capacitor in a branch circuit connected through contacts of a corresponding one of said relays to such second terminal.

13. In combination a plurality of negative resistance devices each connected in an individual electric circuit and each having predetermined minimum breakdown voltage and sustaining current characteristics, a common electric circuit to which all of said individual circuits are connected, means in said common circuit simultaneously enabling at least two of said devices for conduction at a current level in excess of the sustaining current level thereof, two parallel connected branch circuits in said common electric circuit, a first one of said branch circuits having a much higher resistance than a second one of said branch circuits, the resistance of said first branch circuit being adapted to cooperate with said enabling means to permit a current flow corresponding to the sustaining current level of the one of said devices having the largest sustaining current and said second branch circuit being adapted to cooperate with said enabling means to permit a current flow which is larger than the total sustaining current of a plurality of said devices, a switching device connected in said second branch circuit and normally resting in a nonconducting condition, means detecting current flow in said first branch circuit, a timing circuit coupled to the output of said detecting means for producing an output signal at a predetermined time after actuation by said detecting means, and means operating said switching means to a conducting condition in response to said output signal.

14. In combination a plurality of negative resistance devices each connected in an individual electric circuit and having predetermined breakdown voltage and sustaining current characteristics, a common electric circuit to which all of said individual circuits are connected, means in said common electric circuit enabling at least two of said devices for conduction at a current level in excess of the sustaining current level of the one of said devices having the highest sustaining current characteristic, said enabling means including control means providing actuating signals and means responsive to said signals applying an enabling potential to one terminal of all of said devices, and means in said common circuit limiting full conduction therein to a level which is adequate to sustain conduction in only one of said devices, said limiting means being operative for a predetermined time to permit only one of said enabled devices to assume the full limited current.

15. The combination in accordance with claim 14 in which said enabling means applies a voltage at least equal to said breakdown voltage to said devices, and voltage limiting means are coupled to said enabling means for limiting such applied voltage to be less than twice the magnitude of said breakdown voltage.

16. The combination in accordance with claim 14 in which said applying means includes voltage integrating means, and means limiting the output of said integrating means to a predetermined maximum voltage level greater than said breakdown voltage but less than twice the magnitude of said breakdown voltage.

References Cited

UNITED STATES PATENTS

| | | | |
|---|---|---|---|
| 3,103,647 | 9/1963 | Dorros | 307—258 XR |
| 3,204,044 | 8/1965 | Porter | 179—18 |
| 3,284,575 | 11/1966 | Howard | 179—31 XR |
| 3,321,583 | 5/1967 | Maul | 179—18 |

DONALD J. YUSKO, *Primary Examiner.*

U.S. Cl. X.R.

179—18; 307—258